United States Patent [19]

Götting et al.

[11] 4,440,533
[45] Apr. 3, 1984

[54] DEBURRING TOOL

[75] Inventors: Otto Götting; Walter Hess; Franz Nicolai, all of Mülheim-Ruhr, Fed. Rep. of Germany

[73] Assignee: Mannesmann AG, Duesseldorf, Fed. Rep. of Germany

[21] Appl. No.: 378,688

[22] Filed: May 17, 1982

[30] Foreign Application Priority Data

May 15, 1981 [DE] Fed. Rep. of Germany ........ 3119943

[51] Int. Cl.³ .............................................. B23D 1/10
[52] U.S. Cl. ..................................... 409/299; 409/300
[58] Field of Search ................................ 409/299, 300

[56] References Cited

U.S. PATENT DOCUMENTS

| | | | |
|---|---|---|---|
| 2,573,295 | 10/1951 | Allardt | 409/299 |
| 2,714,338 | 8/1955 | Nance | 409/299 |
| 3,352,208 | 11/1967 | Thomas et al. | 409/299 |
| 3,783,722 | 1/1974 | Bosworth | 409/299 |
| 3,911,710 | 10/1975 | Gest | 409/299 |

FOREIGN PATENT DOCUMENTS 56-62709 5/1981 Japan ................................ 409/299

*Primary Examiner*—Francis S. Husar
*Assistant Examiner*—Steven B. Katz
*Attorney, Agent, or Firm*—Ralf H. Siegemund

[57] ABSTRACT

A tool for deburring the inside wall of welded tubes includes a tool body carrying a cutter, and a lower roller is linked to the body, being urged at a constant force against the tube wall; the body carries an upper roller linked to a rod that is accessible externally to a tube receiving the tool for urging the upper roller against the tube diametrically opposed to the lower roller. The pressure differential effective on the upper roller and the lower roller is measured for determining any drop in effective cutting forces, variation in cutting depth or the like.

2 Claims, 1 Drawing Figure

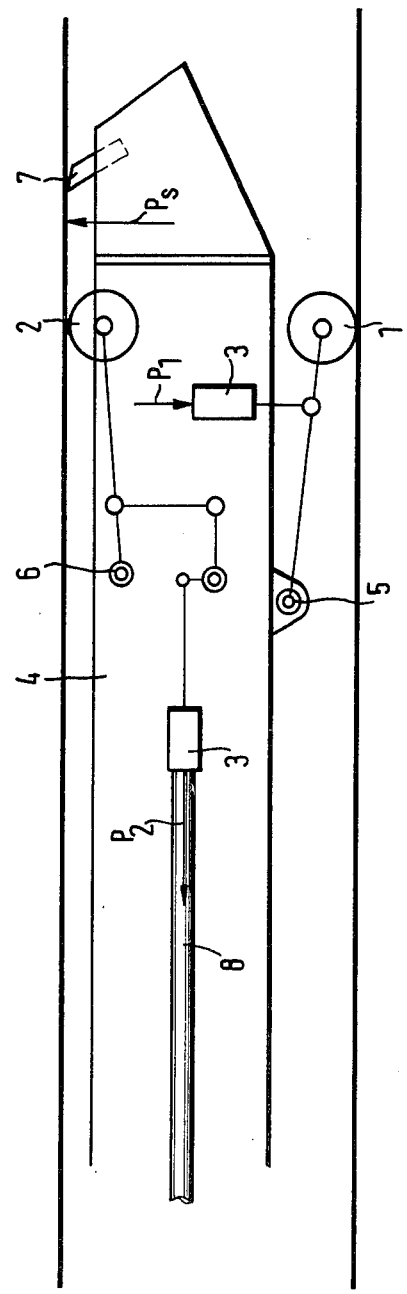

DEBURRING TOOL

BACKGROUND OF THE INVENTION

The present invention relates to a tool for deburring a welded tube under utilization of reciprocating continual control of the cutting depth. More particularly, the invention relates to such a tool wherein the cutter proper is pneumatically or hydraulically forced against the inner wall of a tube to be deburred.

Tools of the type to which the invention pertains are used particularly for removing the welding burr on longitudinally welded tubes or pipes, the burr to occur particularly along the inside wall of the tubing. These tools are usually constructed either with a fixed position cutter or with a resiliently mounted and positionable cutter. Alternatively, it is also known to regulate the pressure by means of which the cutter is forced against the material to be cut under utilization of a pneumatic pressure or by means of a pressurized fluid. See, for example, German Pat. No. 10 21 319.

The known constructions are disadvantaged by the fact that the deburring tool is rather cumbersome with respect to its reaction and response, for example, to geometric unevenness of the tube wall on either or both sides of the burr to be removed. Moreover, it is of disadvantage in the known tooling that no particular indication is provided concerning the depth of deburring and concerning also the state and condition of the cutter. Controlled adjustment, such as a follow-up control for the depth of deburring is not possible in the known tools except, of course, after the pass has been interrupted and the tool withdrawn for the purpose of such adjustment.

DESCRIPTION OF THE INVENTION

It is an object of the present invention to improve tools for deburring the inside wall surfaces of a tubing so that reproduceable conditions can be maintained as far as cutting and, particularly, maintaining the cutting depth is concerned on the basis of particular operating parameters, the tool is to be usable for deburring of a variety of different diameter tubes.

It is a particular object of the present invention to provide a new and improved tool for deburring the inside wall of tubes which includes a movable tool body on which is mounted a cutter, and the improvement is to relate particularly to the control of the cutting force.

In accordance with the preferred embodiment of the present invention, it is suggested to provide a lower roller for positioning the body and linking such a roller to the body; moreover, the lower roller is to be subjected to a constant pressure force by means of which the roller is urged against the tube wall. Preferably diametrically opposed to the lower roller, there is to be provided an upper roller linked to the body by means of a linkage which further includes a rod which is accessible from the outside, that is, from outside the tube in which the tool has been inserted; forces exerted by the rod upon the linkage are directly translated into a pressure force by means of which the upper roller is urged against the wall of the tubing; the pressure differential of forces as effective on the upper and lower rollers is ascertained and will indicate directly the cutting force and, particularly, the interaction of forces between the cutter and the tube wall burr or the like. It can be seen that the cutting depth can readily be controlled through controlling the force exerted by means of the rod upon the linkage in a manner that depends upon the reading of the pressure differential measuring equipment. The conditions are such that the operating conditions are reproducible in the sense that similar force conditions on the rod result in similar conditions of interaction between cutter and tube wall. In addition, one can, of course, monitor the cross section of the cutting. It should be mentioned that the breakout or break-off of a portion of the cutting edge can immediately be ascertained in that the pressure differential measurement will, in fact, produce a jump; and that particular jump can be used to change the force exerted by the rod upon linkage of the upper roller to restore constant cutting conditions in spite of the damage to the tool.

DESCRIPTION OF THE DRAWING

While the specification concludes with claims particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

The FIGURE illustrates, somewhat schematically, a longitudinal view through a tool in accordance with the preferred embodiment of the present invention for practicing the best mode thereof as far as it is applied to the interior of the tube.

Proceeding now to the detailed description of the drawing, the outermost lines indicate the tube to be deburred particularly by means of a cutter 7 which is shown in engagement with the inner wall of the tube and cuts along a welding burr. The particular tool includes further a lower roller 1 and an upper roller 2, both being adjustably positioned and connected to basic tool body 4. In particular, the roller 1 is pivoted by means of an arm around a pivot point 5 and the roller 2 is pivoted by means of another arm around a pivot point 6. Pivot points 5 and 6 are both linked to the body and carriage 4 to, thereby, establish the connection to the two rollers 1 and 2. A differential pressure measuring device 3 is interposed between the upper roll 2 and lower roll 1.

The tool, i.e., cutter 7, is mounted to the front of the carriage and body 4 and is particularly clamped thereto in a releasable fashion. The mechanical positioning is carried out by means of a rod 8. The rod 8 may be adjusted pneumatically, hydraulically, or otherwise, in order to exert an adjustable pressure upon the equipment and does, ultimately, determine the force by means of which the cutter 7 is urged against the wall of the tube. Generally speaking this force is adjustable at will, and the equipment is designed to permit ascertaining the requisite force to be exerted for obtaining the desired operation, including particular control of the cutting depth and here, more particularly, a constant cutting depth, irrespective of unevenness of the surface and possible blunting of the cutting edge.

The roll 1 is under direct force $P_1$, for example, through linkage of the lever arm by means of a constant pressure device to the carriage and tool body 4. As a general rule, it is required that the pressure $P_1$ be constant; but the pressure is to be measured by a portion of the differential measuring equipment. The pressurized medium is supplied externally through suitable conduits, but the effective pressure is measured locally. The rod 8 is linked to the arm carrying the roller 2 by means of a linkage and the force exerted through the arm upon the roller via that linkage is, of course, measured by means of the other portion of the differential transducing equipment 3. It can readily be seen that the pressure $P_1$ as exerted upon roller 1 can also be interpreted as the interacting force between the roller 1 and the tube being, in fact, the resultant of the following combination of forces.

First of all, the weight G of the entire equipment rests upon that roller 1. In addition, any force exerted through rod 8 and the linkage upon roller 2, forcing roller 2 against the wall of the tube, will result in a reaction of the tube against the roller 2, which force is added to the weight (G) and, therefore, is an additional force upon roller 1. Finally, there is a reaction force between the tube and the cutter 7 which is, in effect, equal to the cutting pressure $P_S$ of the blade. Therefore, one may say that $P_1$ equals $P_2+G+P_S$.

Since the weight of the equipment is constant-since the pressure $P_1$ is to be maintained constant, it can readily be seen that the cutting pressure varies oppositely to the pressure $P_2$ as exerted upon the equipment. One can, of course, also say that the pressure $P_2$ measured at the particular rod is directly dependent upon the deburring depth and the tool's wear as it reflects upon the cutting pressure and the pressure exerted by the tube material upon the tool; and as stated under the particular condition, these forces vary in opposition to each other. It can readily be seen that under the operating conditions under which the pressure $P_2$ is adjusted in a particular manner, a change is measured by means of the differential instrument 3 if the edge blunts, breaks off, or otherwise wears out. This has a direct effect on the pressure that can be measured at the rod 8, and the difference between $P_1$ and $P_2$ permits directly the ascertaining of the cutting depth and the state of the deburring tool at that point in time so that a change in external force exerted upon the rod 8 permits an adjustment here in order to obtain constant operating and working conditions.

The cutter 7 is radially and axially movably mounted in the body 4, and the latter may include a temperature sensor responsive to the temperature of a welding seam for permitting centering of the cutter with respect to the welding seam for permitting centering of the cutter with respect to the welding seam to be deburred.

The invention is not limited to the embodiments described above; but all changes and modifications thereof, not constituting departures from the spirit and scope of the invention, are intended to be included.

We claim:

1. A tool for deburring the inside wall of welded tubes, including a tool body on which is mounted a cutter, the tool further comprising:

a lower roller linked to the body and being subjected to a constant force by a means for urging the lower roller against the tube wall;

an upper roller;

linkage means, including a rod that is accessible externally to a tube when the tool is inserted in the tube, the linkage means further being connected to the upper roller to urge the upper roller at variable pressure forces against the tube wall; and means for measuring the pressure differential effective between the upper roller and the lower roller.

2. The tool as in claim 1, wherein the measuring means includes a portion being included in the linkage means.

* * * * *